United States Patent
Tokui et al.

(10) Patent No.: US 10,937,174 B2
(45) Date of Patent: Mar. 2, 2021

(54) IMAGE PROCESSING DEVICE, IMAGE PROCESSING PROGRAM, AND RECORDING MEDIUM

(71) Applicant: SHARP KABUSHIKI KAISHA, Sakai (JP)

(72) Inventors: Nao Tokui, Sakai (JP); Ryuhji Kitaura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 101 days.

(21) Appl. No.: 16/308,403

(22) PCT Filed: Jun. 8, 2017

(86) PCT No.: PCT/JP2017/021399
§ 371 (c)(1),
(2) Date: Dec. 7, 2018

(87) PCT Pub. No.: WO2017/213244
PCT Pub. Date: Dec. 14, 2017

(65) Prior Publication Data
US 2019/0139230 A1    May 9, 2019

(30) Foreign Application Priority Data

Jun. 8, 2016    (JP) .............................. JP2016-114835

(51) Int. Cl.
*G06T 7/20*    (2017.01)
*H04N 7/18*    (2006.01)
(Continued)

(52) U.S. Cl.
CPC .................. *G06T 7/20* (2013.01); *G06T 3/00* (2013.01); *H04N 1/00* (2013.01); *H04N 5/232* (2013.01);
(Continued)

(58) Field of Classification Search
CPC ..... G06K 9/00228; G06T 3/0018; G06T 7/20; G06T 3/00; G11B 27/005; G11B 27/28; H04W 36/32; H04W 48/16; H04N 1/00; H04N 7/18; H04N 7/188; H04N 5/232; H04N 5/232235; H04N 5/232238
See application file for complete search history.

(56) References Cited

U.S. PATENT DOCUMENTS

| 2006/0238653 | A1* | 10/2006 | Tobita | G11B 27/005 348/581 |
| 2007/0174774 | A1* | 7/2007 | Lerman | H04L 67/34 715/723 |
| 2007/0189708 | A1* | 8/2007 | Lerman | G11B 27/034 386/280 |

FOREIGN PATENT DOCUMENTS

| JP | H09-062861 A | 3/1997 | |
| JP | 2006-313511 A | 11/2006 | |
| WO | WO-2017187691 A1 * | 11/2017 | ............. H04N 5/232 |

* cited by examiner

Primary Examiner — Jingge Wu
(74) Attorney, Agent, or Firm — ScienBiziP, P.C.

(57) ABSTRACT

An image processing device is an image processing device configured to edit and output a video having been input. The image processing device includes a feature portion detecting unit configured to detect a feature portion from a frame incorporated in the video having been input, and a setting unit and an image generating unit configured to cause a playback speed of a frame incorporated in the video having been input and including the feature portion detected to be different from a playback speed of a frame including no feature portion detected, and output the video.

5 Claims, 7 Drawing Sheets

(51) Int. Cl.
*H04N 5/232* (2006.01)
*H04N 1/00* (2006.01)
*G06T 3/00* (2006.01)

(52) U.S. Cl.
CPC ... *H04N 5/23238* (2013.01); *H04N 5/232935* (2018.08); *H04N 7/18* (2013.01); *H04N 7/188* (2013.01)

IMAGE PROCESSING DEVICE, IMAGE PROCESSING PROGRAM, AND RECORDING MEDIUM

TECHNICAL FIELD

An aspect of the present invention relates to image processing technology, particularly, to an image processing device configured to subject an image to proper editing processing.

BACKGROUND ART

An image having an angle of view wider than a normal angle of view, namely, a wide angle image and a panoramic image can be captured by using a camera equipped with a fisheye lens or an omnidirectional mirror. Various kinds of technology in which a user arbitrarily designates a line-of-sight direction of an observer, and an angle of view corresponding to the designated line-of-sight direction is displayed from this wide angle image to provide the user a visual experience as if the user were in another space have been proposed. For example, PTL 1 discloses a method for displaying a panoramic video including a viewpoint and a line-of-sight direction that is continuously changed according to auser's designation.

CITATION LIST

Patent Literature

PTL 1: JP 9-62861 A (published on Mar. 7, 1997)

SUMMARY OF INVENTION

Technical Problem

However, in the method disclosed in PTL 1, a user needs to determine a viewpoint and a line-of-sight direction in a wide angle image. Since the user does not know where to focus on in an image the user views for the first time, and the user needs to repeat configuration of the viewpoint and the line-of-sight direction. Further, in an image generated by configuring only a viewpoint and a line-of-sight direction, a feature portion such as an event and a mark to be focused on by a user may be present at a position outside an angle of view of the image, and there has been a matter of important information failing to be noticed.

An aspect of the present invention is made in view of the problems described above, and an object of the present invention is to add editing in a spatial direction and a time axis direction to an image and thus, to generate an image in which a feature portion such as an event and a mark to be focused on by a user is emphasized.

Solution to Problem

To solve the problems described above, an image processing device according to an aspect of the present invention is an image processing device configured to edit and output a video having been input. The image processing device includes a feature portion detecting unit configured to detect a feature portion from a frame incorporated in the video, and an output unit configured to cause the playback speed of a frame incorporated in the video and including the feature portion detected to be different from the playback speed of a frame including no the feature portion detected, and output the video.

Advantageous Effects of Invention

According to an image processing device of an aspect of the present invention, an effect of enabling generation of an image subjected to proper editing processing according to a feature portion detected from an input image can be achieved.

DESCRIPTION OF EMBODIMENTS

Embodiments according to the present invention will be described in detail below with reference to the accompanying drawings. The accompanying drawings merely illustrate specific embodiments complying with a principle of the present invention. These drawings are provided only for understanding the present invention and not for construing the present invention in a limited manner. Moreover, note that since elements illustrated in the accompanying drawings are intentionally illustrated in an exaggerated manner to convery a deeper understanding of the present invention, the elements illustrated in the accompanying drawings are different from actual elements in intervals and sizes.

In the following description, in a case that a reference sign assigned to a certain element in a drawing is also assigned to the same element in another drawing, the same element is the same as the certain element in constitution, a function and the like, and thus, a detailed description of the same element will be omitted. Moreover, the "image" described below refers to both a still image and a video. Further, in a case that a video includes sound information, the "image" also includes the sound information.

Embodiment 1

Embodiment 1 according to the present invention will be described below based on FIG. 1 to FIG. 5.

Device Constitution

Figure 1:
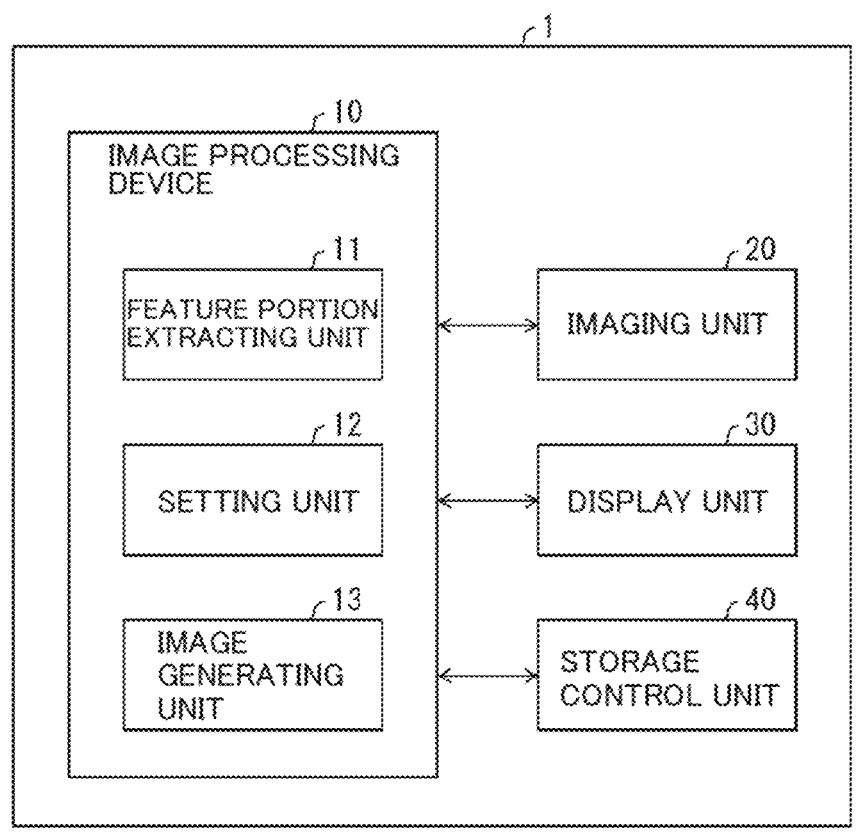
FIG. 1 is a functional block diagram illustrating constitution of an image display device including an image processing device according to Embodiment 1 of the present invention.
Figure 2:
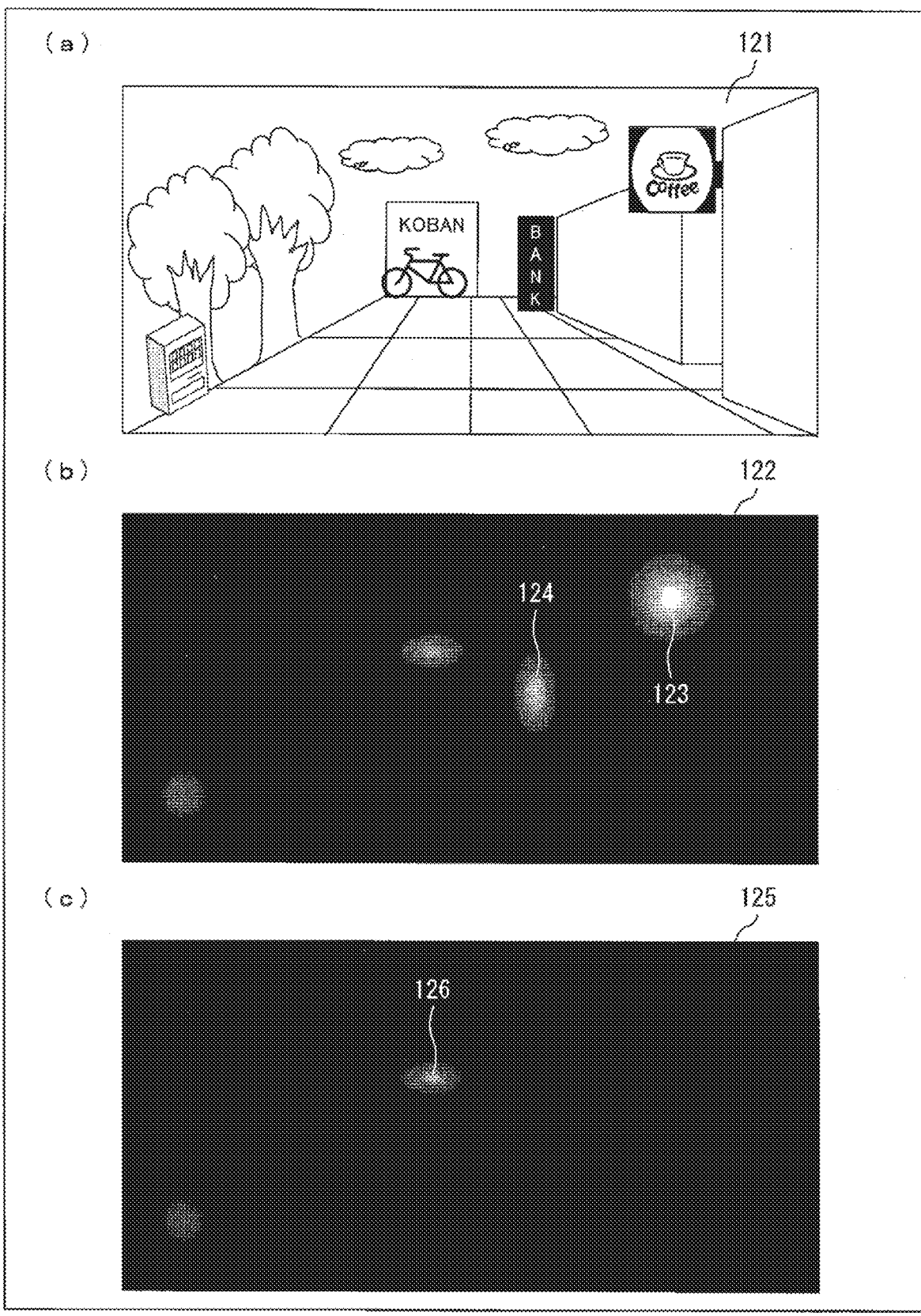
FIG. 2 is an example for describing extraction of a feature portion in Embodiment 1 of the present invention.
Figure 3:
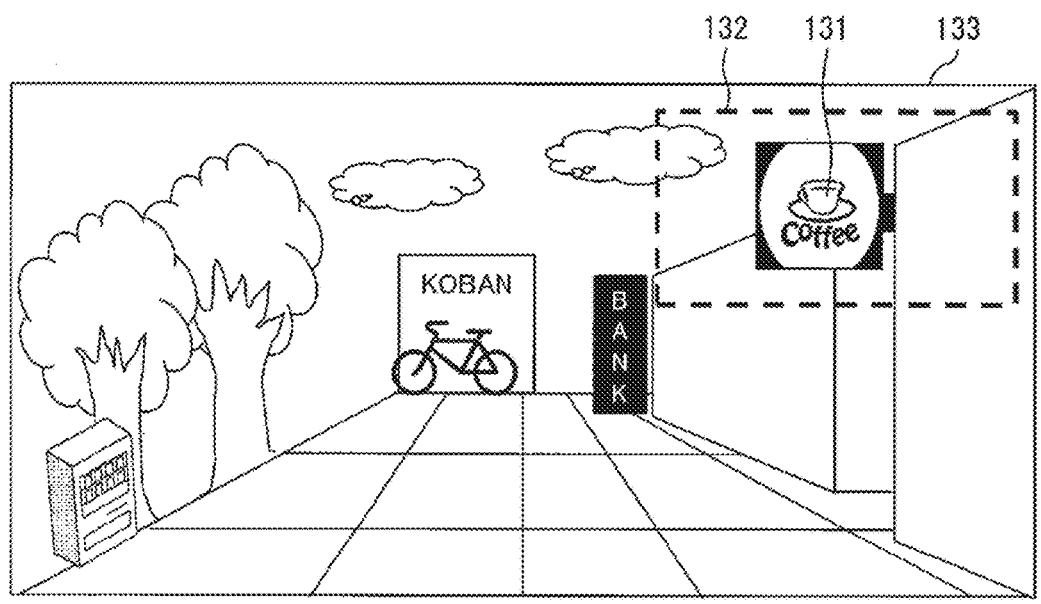
FIG. 3 is an example for describing image generation in Embodiment 1 of the present invention.
Figure 3:
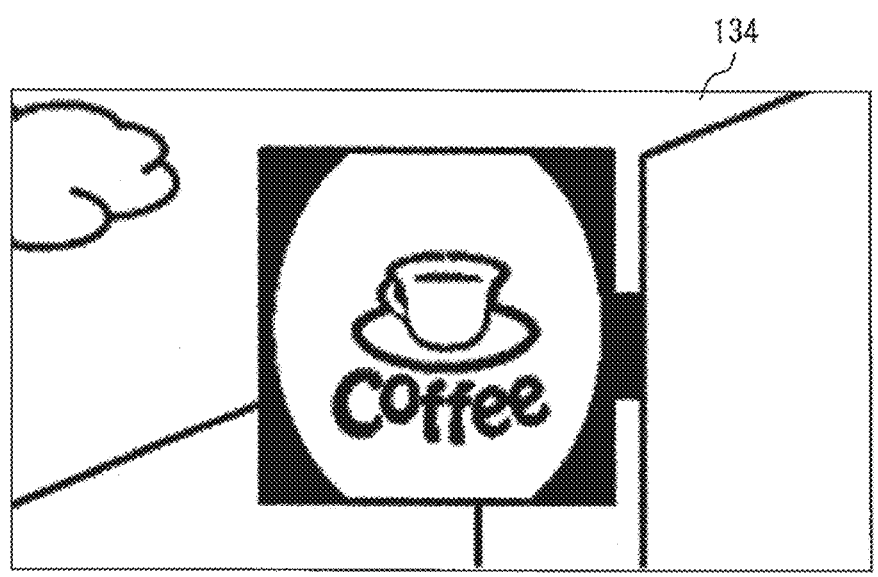

FIG. 1 is a functional block diagram illustrating the constitution of an image display device 1 including an image processing device 10 according to Embodiment 1 of the present invention. As illustrated in FIG. 1, the image display device 1 includes the image processing device 10, an imaging unit 20, a display unit 30, and a storage control unit 40. The image processing device 10 includes a feature portion extracting unit (feature portion detecting unit) 11, a setting unit (output unit) 12, and an image generating unit (output unit) 13. The image processing device 10 is an image processing device configured to edit and output a video having been input. The "editing" of a video in the present embodiment refers to the cutting of individual frames of a video and the generation of the cut image, a change of the playback speed (special playback), and the like.

Imaging Unit 20

The imaging unit 20 includes an imaging lens and an imaging element such as a Charge Coupled Device (CCD), and takes an image of a subject to generate an image (a still image or a video) including the subject.

Display Unit 30

The display unit 30 is a display screen such as a Liquid Crystal Display (LCD) and an organic Electro Luminescence (EL) display, and displays information such as an image and a character, an image of a subject, and the like.

Storage Control Unit 40

The storage control unit 40 generally uses a member capable of storing an image in a recording medium or capable of reading an image stored in the recording medium to output the image to the image processing device 10. The storage control unit 40 may be, for example, a member configured to read an image from a prescribed recording medium and reproduce the read image. Examples of the recording medium include a storage device inside a commercially available camera (a digital still camera, a video camera, and the like), or a detachable storage device (an electronic medium such as a magnetic optical disk and a semiconductor memory).

The imaging unit 20, the display unit 30, and the storage control unit 40 are generally used devices, and do not directly relate to features of the present invention. Therefore, detailed description of these devices will be omitted.

Image Processing Device 10

The image processing device 10 generates an image (hereinafter referred to as a "cut image") obtained by cutting a portion of an image (hereinafter referred to as an "input image") acquired from the imaging unit 20 or the storage control unit 40, and outputs the image to at least one of the display unit 30 and the storage control unit 40. The input image may be a video including a plurality of frame images. The image processing device 10 can be constituted as, for example, a Central Processing Unit (CPU), or a Graphic Processing Unit (GPU, a processing device for image processing).

Feature Portion Extracting Unit 11

The feature portion extracting unit 11 extracts (detects) a feature portion by using the input image acquired by the image processing device 10 from the imaging unit 20 or the storage control unit 40. Here, the feature portion is, for example, a subject likely to attract human visual attention in an image. Specifically, the feature portion can be extracted by processing which will be described later. For example, a signboard, a building or the like is the feature portion in an image in which a route guidance or the like is captured. In other words, the feature portion is not limited to one pixel, and may be an object including a plurality of pixels. Details of this processing will be described later. Moreover, in a case that the input image is a video, the feature portion in each of frame images is extracted.

Note that as long as the feature portion extracting unit 11 detects the feature portion from a frame incorporated in a video being the input image, the feature portion extracting unit 11 may detect the feature portion from each frame of the video, or may detect the feature portion from a prescribed number of frames incorporated in the video, or may detect the feature portion from a frame incorporated in the video at each prescribed time interval.

Setting Unit 12

The setting unit 12 configures a line-of-sight direction, an angle of view, and a playback speed of the cut image generated by the image generating unit 13, based on the feature portion extracted by the feature portion extracting unit 11. Details of this processing will be described later.

Image Generating Unit 13

The image generating unit 13 uses the input image acquired by the image processing device 10 from the imaging unit 20 or the storage control unit 40 to generate the cut image obtained by cutting a portion of the input image based on the line-of-sight direction, the angle of view, and the playback speed configured by the setting unit 12, and outputs the cut image to the display unit 30. Details of this processing will be described later.

Details of Feature Portion Extracting Unit 11

The feature portion extracting unit 11 extracts the feature portion from the input image. The feature portion extracting unit 11 first generates a conspicuity map to extract the feature portion from the input image, and extracts the most conspicuous pixel as the feature portion from the generated conspicuity map. Next, a method for generating the conspicuity map by the feature portion extracting unit 11 will be described. The conspicuity map indicates a likelihood that each portion of the input image may attract visual attention, namely, conspicuity by a numeric value. As the method for generating the conspicuity map, a method for generating a conspicuity map by using color, brightness, and an edge direction of an image (L. Itti, C. Koch and E. Niebur, "A Model of Saliency-based Visual Attention for Rapid Scene Analysis", IEEE Trans. PAMI, Vol. 20, No. 11, pp. 1254 to 1259, 1998), a method for generating a conspicuity map by using motion in addition to color, brightness, and an edge direction, and the like are known. The conspicuity map can be achieved by using the methods described above.

Each of FIGS. 2A to 2C illustrates an example in which a conspicuity map 122 is generated from an input image 121. The conspicuity map 122 illustrated in FIG. 2B indicates a degree of conspicuity by a brightness value. A pixel having high conspicuity (a pixel likely to attract visual attention) is indicated by white (255), and a pixel having low conspicuity (a pixel less likely to attract visual attention) is indicated by black (0). A signboard or the like is often formed in color or a shape attracting public attention, and thus has high conspicuity calculated.

Next, a method for extracting the feature portion from the conspicuity map will be described. A region of a pixel having the highest conspicuity is extracted as the feature portion from the conspicuity map. In the example illustrated in FIG. 2B, a region 123 is a region of a pixel having the highest conspicuity, and thus the region 123 is assumed to be the feature portion.

Next, an example of a case where a plurality of the feature portions are extracted will be described. Second and subsequent feature portions are extracted by repeatedly performing processing of extracting the region of a pixel having the highest conspicuity from the conspicuity map in which a region having already been extracted and pixels surrounding the region are filled in with a value of zero. For example, in a conspicuity map 125 in FIG. 2C, the region 123 and a region 124 extracted as feature portions in the conspicuity map 122 and pixels surrounding the region 123 and the region 124 are filled in with black (value of zero). Here, a region 126 is extracted as a third feature portion from the conspicuity map 125. Note that a size of a region of the surrounding pixels filled in this case can be configured appropriately according to a size of the input image and a size of a feature portion to be extracted. Note that a region of a pixel having conspicuity less than or equal to a threshold value may not be detected as the feature portion even when the region is a region of a pixel having the highest conspicuity in the conspicuity map.

Details of Setting Unit 12

The setting unit 12 configures the line-of-sight direction, the angle of view, and the playback speed of the cut image generated by the image generating unit 13. The line-of-sight direction refers to a point corresponding to central coordinates in the cut range used when a portion of the input image is cut. The angle of view refers to the cut range used when a portion of an image is cut.

The playback speed refers to the playback speed of the cut image generated. For example, the playback speed can be configured to be a stop (pause), to be higher than a reference playback speed (fast forward), and to be lower than the reference playback speed (slow motion).

A mode of the "pause" may be achieved by, for example, duplicating a frame image to arrange the same frame images. Moreover, a mode of the "slow motion" may be achieved by, for example, generating a new similar frame image to arrange frame images having similar contents. Moreover, a mode of the "fast forward" may be achieved by, for example, thinning a frame image to reduce the number of frame images so that it is less than the number of a set of original frame images.

In other words, a set of frame images different from a set of frame images incorporated in an original video is generated by duplicating a frame image, generating a new image, or thinning a frame image according to the feature portion. Then, one cut image may be generated from each of the frame images incorporated in this set of frame images generated to achieve cut images varying in a playback speed according to the feature portion.

The reference playback speed refers to a playback speed serving as a reference when a playback speed is changed. For example, the reference playback speed can be configured to be a playback speed of the input image or a playback speed configured according to a walking pace of a human. Here, the description will be made assuming that the reference playback speed is a playback speed of the input image. In other words, a case where a plurality of frame images that are successively reproduced are incorporated in the input image is assumed to be a case where playback is done at the reference playback speed.

First, an operation of the setting unit 12 in a case that the feature portion is extracted by the feature portion extracting unit 11 will be described. The line-of-sight direction is configured to continuously move from a reference line-of-sight direction to the feature portion. The reference line-of-sight direction refers to a line-of-sight direction serving as a reference when a portion of the input image is cut, and may be determined in advance or may dynamically be changed. Here, the description will be made assuming that the center of the input image is the reference line-of-sight direction.

In this case, when the angle of view of the cut image is also continuously changed so that it is narrowed, the feature portion is easily visually recognized. Therefore, such a change of the angle of view of the cut image is suitable. For example, in the reference line-of-sight direction, the angle of view of the cut image is configured to be 60 degrees both in a right-and-left direction and an up-and-down direction. In a case that the line-of-sight direction is continuously changed from the reference line-of-sight direction to the feature portion, and the line-of-sight direction is the feature portion, the angle of view of the cut image is configured to continuously fluctuate to be 30 degrees both in the right-and-left direction and the up-and-down direction. The angle of view is continuously changed together with the line-of-sight direction in this way and thus, when the feature portion is cut to be the line-of-sight direction, namely, the center of the cut image, a proportion of the feature portion occupying the angle of view increases and a user can easily confirm the feature portion. Therefore, such a change of the angle of view is suitable. Moreover, zooming, namely, processing in order to enlarge an image may be used to prevent a change in a cut image size. Using such a display method, eye movement due to a change in the fixation point can be expressed, and a more natural display can be achieved.

Note that assuming that the angle of view in the right-and-left direction is configured to be 60 degrees, the cut range of the cut image is x/6 pixels (=x×60/360) in a case that the input image is an image (horizontal×pixel) captured by a camera having an angle of view in the right-and-left direction of 360 degrees. Similarly, assuming that the angle of view in the up-and-down direction is configured to be 60 degrees, the cut range of the cut image is y/6 pixels (=y×60/360) in a case that the input image is an image (vertical y pixel) captured by a camera which has an angle of view in the up-and-down direction of 360 degrees. Similarly, in a case that the angle of view is 30 degrees, the cut range of the cut image is horizontal x/12 pixels and vertical y/12 pixels.

Moreover, when the playback speed is configured to stop or be lower than the reference playback speed, and the line-of-sight direction is configured to move to the feature portion and then continuously move from the feature portion to the center of the input image, a user can easily grasp a position in the input image. Therefore, such configuration is suitable. For example, in the input image such as a route guidance image captured during movement, the line-of-sight direction is continuously changed toward the feature portion such as a signboard, and then while the line-of-sight direction is continuously converted from the signboard toward the center of the input image, the playback speed is configured to be a stop or to be lower than the reference playback speed to prevent the capturing position from moving. Thus, a clear image can be provided without causing a person viewing the cut image to misinterpret the route and the capturing position. In a case that the plurality of feature portions are extracted, the above-described processing may be repeated for each of the feature portions, or the angle of view may be expanded to enable the feature portions to be confirmed at once. Note that an image cut by zooming each feature portion may be superimposed on an image cut to have the angle of view expanded, and the image cut may be displayed. In this case, a user may zoom and select the feature portion to be displayed. For example, it can be determined that the feature portion has been selected from instruction information of a user input from an input device not illustrated, and an image cut by zooming the selected feature portion can also be superimposed and displayed.

Moreover, instead of repeatedly moving the line-of-sight direction from the center of the input image to the feature portion for each of the feature portions, the line-of-sight direction is continuously moved from the feature portion to the feature portion, and in this case, similar processing does not need to be repeated, which is suitable. Particularly, in a case that the feature portions are located close to one another, the feature portions located close to one another can be confirmed efficiently, which is suitable.

Next, an operation of the setting unit 12 in a case that no feature portion is extracted by the feature portion extracting unit 11 will be described. In this case, the playback speed is configured to be higher than the reference playback speed. Thus, a section of the input image including no feature portion can be confirmed efficiently. In this case, when the line-of-sight direction is configured to be the reference line-of-sight direction in advance, in a case that the feature portion is extracted, processing can smoothly proceed processing for changing the line-of-sight direction. Therefore, such a configuration is suitable.

Details of Image Generating Unit 13

The image generating unit 13 generates the cut image obtained by cutting a portion of an image, based on the line-of-sight direction, the angle of view, and the playback speed of an image configured by the setting unit 12.

After processing for changing the playback speed is performed, processing for cutting a portion of the input image is performed based on the line-of-sight direction and the angle of view. In a case that the playback speed is at a stop or lower than the reference playback speed, an image obtained by subjecting the input image to duplication processing is assumed to be an input image obtained after the playback speed is changed. In a case that the playback speed is higher than the reference playback speed, an image obtained by subjecting the input image to thinning processing is assumed to be an input image obtained after the playback speed is changed. Here, the playback speed is adjusted by duplicating or thinning the input image, but the playback speed may be adjusted by using a method including performing interpolation between images in a time axis direction to generate a new image. Then, a smooth slow-motion image is generated in the case that the playback speed is lower than the reference playback speed, and a fast-forward image obtained by correcting motion blur is generated in the case that the playback speed is higher than the reference playback speed. Therefore, such adjustment of the playback speed is suitable.

Each of FIGS. 3A and 3B is a view illustrating an example in which a portion of an image 133 obtained after the playback speed is changed is cut based on a line-of-sight direction 131 and an angle of view 132. An image 134 obtained by cutting the portion is output as the cut image. Here, the image 134 cut from the image obtained after the playback speed is changed is used as the cut image, but in a case that an image includes distortion, an image subjected to distortion correction may be used as the cut image. Moreover, in a case that an image saved by equidistant cylindrical projection such as a panoramic image and a full circumferential image of 360 degrees is input, the input image may be mapped on a sphere with the origin as the center, and the cut image may be generated from an image on which perspective projection is performed from the origin. As described above, the cut processing according to the input image is performed and thus, the cut image without distortion can be provided to a user. Therefore, such processing is suitable.

General Processing Flow

Figure 4:
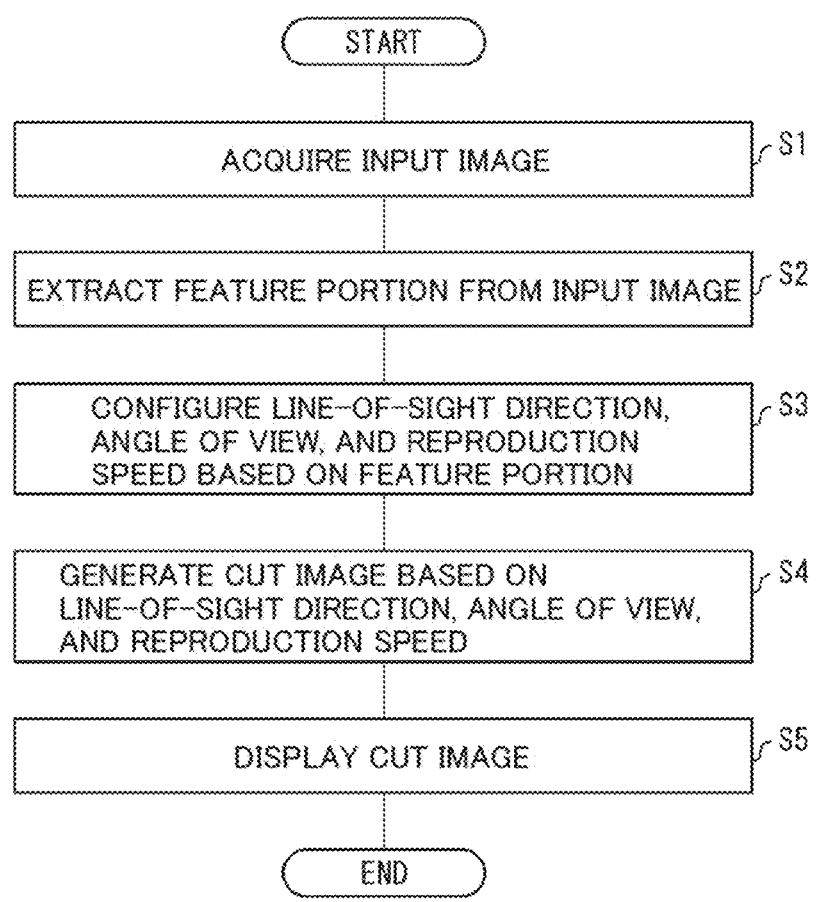
FIG. 4 is a flowchart illustrating a flow of an image processing method performed by the image display device according to Embodiment 1 of the present invention.

FIG. 4 is a flowchart illustrating the flow of an image processing method performed by the image processing device 10 according to Embodiment 1 of the present invention. As illustrated in FIG. 4, when the processing starts, the image processing device 10 acquires the input image to be subjected to image processing for display from the imaging unit 20 or the storage control unit 40 (S1). Next, the feature portion extracting unit 11 extracts the feature portion from the input image and outputs the feature portion to the setting unit 12 (S2). Next, the setting unit 12 configures the line-of-sight direction, the angle of view, and the playback speed of the cut image to be generated, based on the feature portion having been input (S3). Next, the image generating unit 13 generates the cut image obtained by cutting a portion of the input image, based on the line-of-sight direction, the angle of view, and the playback speed configured by the setting unit 12, and outputs the cut image to the display unit 30 (S4). The display unit 30 displays the cut image having been input (S5). Thus, the processing in FIG. 4 ends.

According to the image display device 1 including the image processing device 10 according to Embodiment 1 of the present invention described above, an image subjected to proper editing processing can be generated according to the feature portion extracted from the image.

Note that the image generating unit 13 may generate a video file including the cut image generated, instead of outputting the cut image generated to the display unit 30.

Supplementary Note

Figure 5:
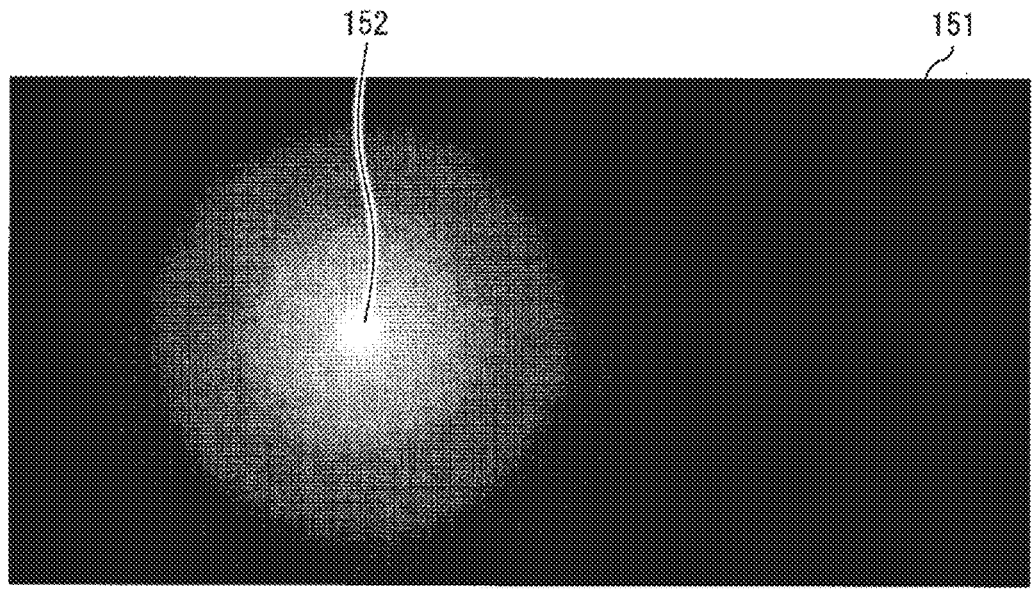
FIG. 5 is a view for describing weighting of a feature portion in Embodiment 1 of the present embodiment.

In the present embodiment, the feature portion extracting unit 11 calculates conspicuity uniformly from the input image, but the present invention is not limited to this embodiment. For example, the range of extracting the feature portion can be adjusted by performing weighting calculated conspicuity. FIG. 5 illustrates an example in which the magnitude of weighting is indicated by a brightness value of an image. A high brightness value (close to white) indicates a great degree of weighting, and a low brightness value (close to black) indicates a low degree of weighting. As indicated in an image 151 illustrating the weighting in FIG. 5, when the weighting is configured to increase closer to an arbitrary point 152 and to decrease further away from the arbitrary point 152, the feature portion closer to the arbitrary point is extracted preferentially. Particularly, in a case that the input image is a route guidance image, the feature portion close to a position in the input image of a subject located ahead in a traveling direction (hereinafter, the position will be referred to as a "position in the traveling direction") of a position of the imaging unit 20 capturing the input image (hereinafter, the position will be referred to as a "capturing position") is important. Thus, the arbitrary point is configured to be the position in the traveling direction and the weighting illustrated in FIG. 5 is performed. Thus, the feature portion close to the position in the traveling direction can be extracted preferentially. Therefore, such a configuration and weighting are suitable.

Moreover, in a case that the input image is an image in which an event is captured, the arbitrary point can be configured to be a point different from the position in the traveling direction, such as a point 180 degrees away from the position in the traveling direction in an image in which the entire circumference of 360 degrees is captured. Thus, an event in the back that a photographer has not noticed during capturing can be extracted preferentially as the feature portion. Therefore, such configuration is suitable. The weighting is performed on the calculated conspicuity in this way and thus, the range of the feature portion to be incorporated in the cut image can be adjusted according to characteristics of the input image and a user's preference. Therefore, such weighting is suitable. Further, the weighting can be changed not only in the spatial direction but also in the time axis direction. For example, in a case that an image is captured during movement, it is determined whether the capturing position is in a straight line or at a corner, and a greater degree of weighting is performed on the image captured in the case of a corner than the image captured in the case of a straight line. To determine whether the capturing position is in a straight line or at a corner, an optical flow is calculated from an image, and when the image is captured while the imaging unit 20 is rotating in the horizontal direction, the capturing position may be determined to be at a corner, and when the image is captured while the imaging unit 20 is not rotating in the horizontal direction, the capturing position may be determined to be in a straight line. Moreover, it may be determined from GPS information or gyrosensor information obtained during capturing of an image and input from an input unit not illustrated whether the capturing position is in a straight line or at a corner. In a case that the input image is a route guidance image, the feature portion at a corner is important. The weighting in the time axis direction is performed and thus, the feature portion at a corner can be extracted preferentially. Therefore, such weighting is suitable.

When conspicuity of a pixel (x, y) on a conspicuity map is i, a value of the weighting on the conspicuity map is $w_i$, and the value of the weighting in the time axis direction is $w_t$, conspicuity i' obtained after the weighting can be expressed by the following expression.

$$i'=w_i \times w_t \times i$$

In a case that the weighting is to be performed on any one of $w_i$ and $w_t$, the value of the weighting on the other of $w_i$ and $w_t$ on which no weighting is performed is configured to be "1" and thus, influence of the weighting on the other of $w_i$ and $w_t$ on which no weighting is performed can be eliminated.

In the present embodiment, the feature portion extracting unit 11 extracts the feature portion from all the input image, but the present invention is not limited to this embodiment. For example, the extraction range of the feature portion may be restricted to an arbitrary range such as the range of an angle of view of approximately 180 degrees from the reference line-of-sight direction, or the range of an angle of view of 60 degrees both in the up-and-down and right-and-left directions from the reference line-of-sight direction. In this way, the feature portion around the reference line-of-sight direction is extracted and thus, a mark incorporated in a field of view when a user slightly shakes their head can be displayed, and the cut image can be generated in consideration for safety during movement. Therefore, such a configuration is suitable. Particularly, for example, in a case that the feature portion is located on an opposite side in the traveling direction of the capturing position, the feature portion is not extracted and thus, an extreme change in a line of sight during movement can be avoided. Therefore, such a configuration is suitable.

In the present embodiment, the feature portion extracting unit 11 calculates the conspicuity map by using color, brightness, an edge direction, and motion, but the present invention is not limited to this embodiment. For example, in a case that the input image is a route guidance image, rather than a moving object such as a pedestrian and an automobile, the extraction of a stationary object such as a signboard and a building as the feature position is desirable. When conspicuity maps calculated respectively by using color, brightness, an edge direction, and motion are combined, weighting is performed. The weighting in color, brightness, and an edge direction can be configured to be a great degree of weighting, and the weighting in motion can be configured to be a small degree of weighting or negative weighting. Thus, the conspicuity of a stationary object can be calculated to be higher than the conspicuity of an object having motion. Moreover, in a case that the input image is an image in which an event is captured, it is desirable that a moving object such as a firework being set off or a person dancing is extracted as the feature portion. Therefore, by configuring a high degree of weighting to motion, the conspicuity of a moving object can be calculated to be higher than the conspicuity of a stationary object. In this way, when the conspicuity maps calculated respectively by using color, brightness, an edge direction, and motion are combined, weighting is performed and thus, the feature portion to be extracted according to characteristics of the input image can be extracted. Therefore, such a weighting process is suitable.

In the present embodiment, the feature portion extracting unit 11 extracts the feature portion by using the conspicuity map, but the present invention is not limited to this embodiment. For example, in a case that a subject to be extracted as the feature portion is known, image detection may be performed to extract the feature portion. For example, in a case that a signboard is to be extracted, when a letter or character is detected in an image and the detected letter or character is extracted as the feature portion, only the feature portion being a candidate of the signboard can be extracted. Therefore, such an image detection capability is suitable. Moreover, in a case that a person is to be extracted, when a face is detected in an image and the detected face is extracted as the feature portion, only a feature portion recognized as a person can be extracted. Therefore, an such image detection capability is suitable.

Moreover, in a case that a user is to focus on a specific person, the user can operate an operation unit not illustrated to designate a face of the specific person in the input image. Accordingly, the feature portion extracting unit 11 can extract the designated face as the feature portion. Thus, in a case that a face is the feature portion, particularly, in a case that the faces of a plurality of persons are incorporated in the input image, extraction of all the faces as the feature portions by the feature portion extracting unit 11 can be avoided. For example, in a case that a user is to capture his/her own child and focus on the child, the user designates a face of the child as the feature portion. Accordingly, the feature portion extracting unit 11 can extract only the face of the child as the feature portion. Moreover, the setting unit 12 can configure the playback speed used in a period until the child appears to be higher than the reference playback speed. Then, to enlarge the face of the child when the child appears, the setting unit 12 can configure a position and the cut range in the input image and can configure the playback speed to be lower than the reference playback speed. Thus, for example, even in a case where capturing is performed in a crowd, only the child can be focused on.

On the other hand, in a case that a face is the feature portion, particularly, in a case that the faces of a plurality of persons are incorporated in the input image, the feature portion extracting unit 11 may extract all the faces as the feature portions. In this case, the setting unit 12 can move the line-of-sight direction to enable the faces to be focused on in order starting from faces occupying larger area in the input image.

In the present embodiment, the setting unit 12 configures the reference line-of-sight direction to be the center of the input image, but the present invention is not limited to this embodiment. For example, in a case that the input image is an image captured during movement, the traveling direction of the capturing position is estimated from the image, and the position in the traveling direction may be configured to be the reference line-of-sight direction. The traveling direction refers to a movement direction of the imaging unit 20. The position in the traveling direction can be calculated by, for example, a method involving the calculation of optical flows from an image and setting the position in the traveling direction to an intersection of straight lines obtained by extending the optical flows. Particularly, an optical axis direction of a camera and the traveling direction are not necessarily identical to each other in an image captured during movement. Thus, when the traveling direction of the capturing position is estimated to configure the reference line-of-sight direction, the cut image cut with the position in the traveling direction as the center can be generated. Therefore, such configuration is suitable.

In the present embodiment, the setting unit 12 configures the line-of-sight direction, the angle of view, and the playback speed according to the presence or absence of the feature portion and a position of the feature portion, but the present invention is not limited to this embodiment. For example, a corner may be determined from the input image, and configuration of the line-of-sight direction, the angle of view, and the playback may be changed according to whether or not there is a corner. Specifically, it is determined from optical flows of an image whether or not the image is an image captured while the imaging unit 20 is rotating in the horizontal direction, and the line-of-sight direction is configured to look out over the image from the start of the rotation in the horizontal direction to the stop of the rotation in the horizontal direction, and to cause an object in the cut image to move in the horizontal direction. According to such configuration, surroundings at a corner can be recognized visually. Therefore, such a configuration is suitable. Moreover, the line-of-sight direction rotated in the horizontal direction may be moved slightly upward. The line-of-sight direction is moved slightly upward and thus, when a person confirms their surroundings at a corner, a natural image can be generated as if the person grasped his/her own position through a scene such as an upper portion of a building that can be viewed with an upward line of sight. Note that upward refers to an upper side vertical to a horizontal plane. Moreover, when the line-of-sight direction at a corner is rotated horizontally, the playback speed is configured to be at a stop or lower than the reference playback speed and thus, the feature portion is easily confirmed. Therefore, such a configuration is suitable. Further, a more natural image can be generated by configuring the playback speed at a corner to be a speed at which a person shakes their head.

In the present embodiment, the image generating unit 13 outputs an image cut from the input image to the display unit 30 without processing the image cut, but resolution conversion and the like may be performed appropriately according to display resolution of the display unit 30. Moreover, to indicate the feature portion extracted, processing of increasing contrast such as drawing a box around the feature portion or making the feature portion brighter or darker than surroundings of the feature portion to emphasize the feature portion may be performed.

In the present embodiment, the angle of view of the input image is not particularly predetermined. However, when the input image is, for example, an image having a wide angle of view, namely, a wide angle image such as an image having an angle of view of 100 degrees and captured by a wide angle lens, a panoramic image having an angle of view of 180 degrees, an omnidirectional image having an angle of view of 360 degrees, and a full circumferential image or a full celestial image having an angle of view of 360 degrees in the up-and-down and right-and-left directions, the feature portion can be extracted from a wide range. Therefore, such an angle of view of the input image is suitable.

Embodiment 2

Embodiment 2 according to the present invention will be described below with reference to FIG. 6 to FIG. 8. Each member common to each member in Embodiment 1 described above is denoted by the same reference sign, and detailed description of such a member will be omitted.

The present embodiment is different from Embodiment 1 in that an image display device 1a is configured to reduce the amount of change in the line-of-sight direction and the angle of view in a case that the amount of change in the line-of-sight direction and the angle of view is large, and superimpose a region including a feature portion cut from an input image on a cut image to display the region.

Constitution of Image Display Device 1a

Figure 6:
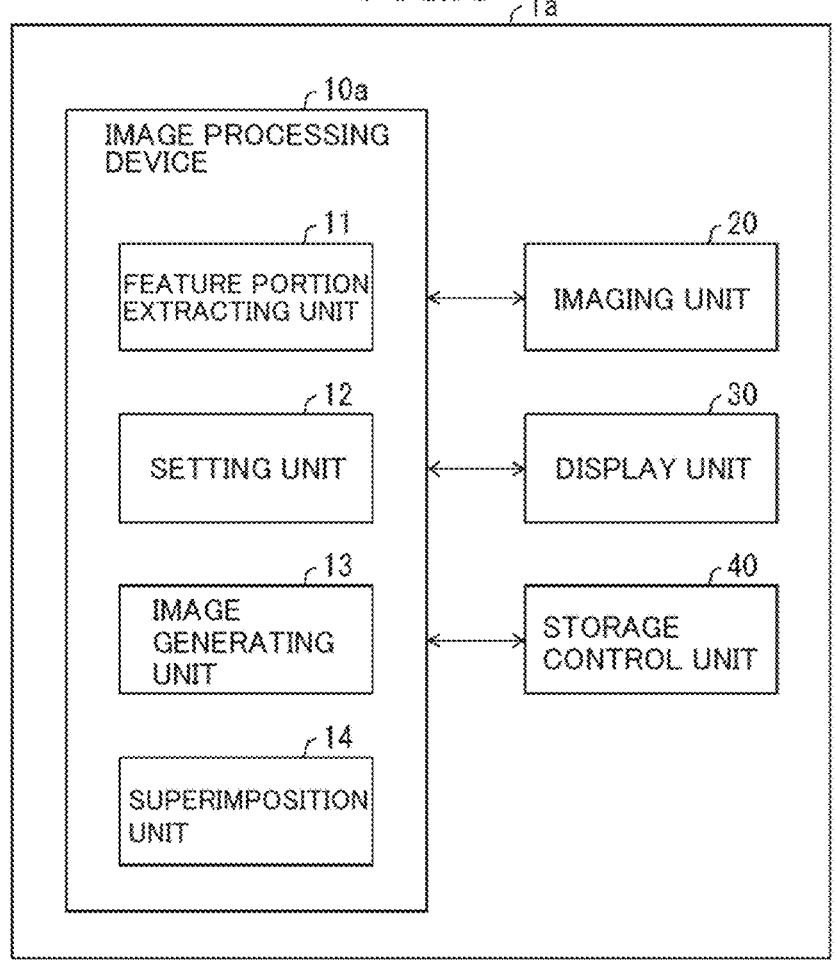
FIG. 6 is a functional block diagram illustrating constitution of an image display device including an image processing device according to Embodiment 2 of the present invention.
Figure 7:
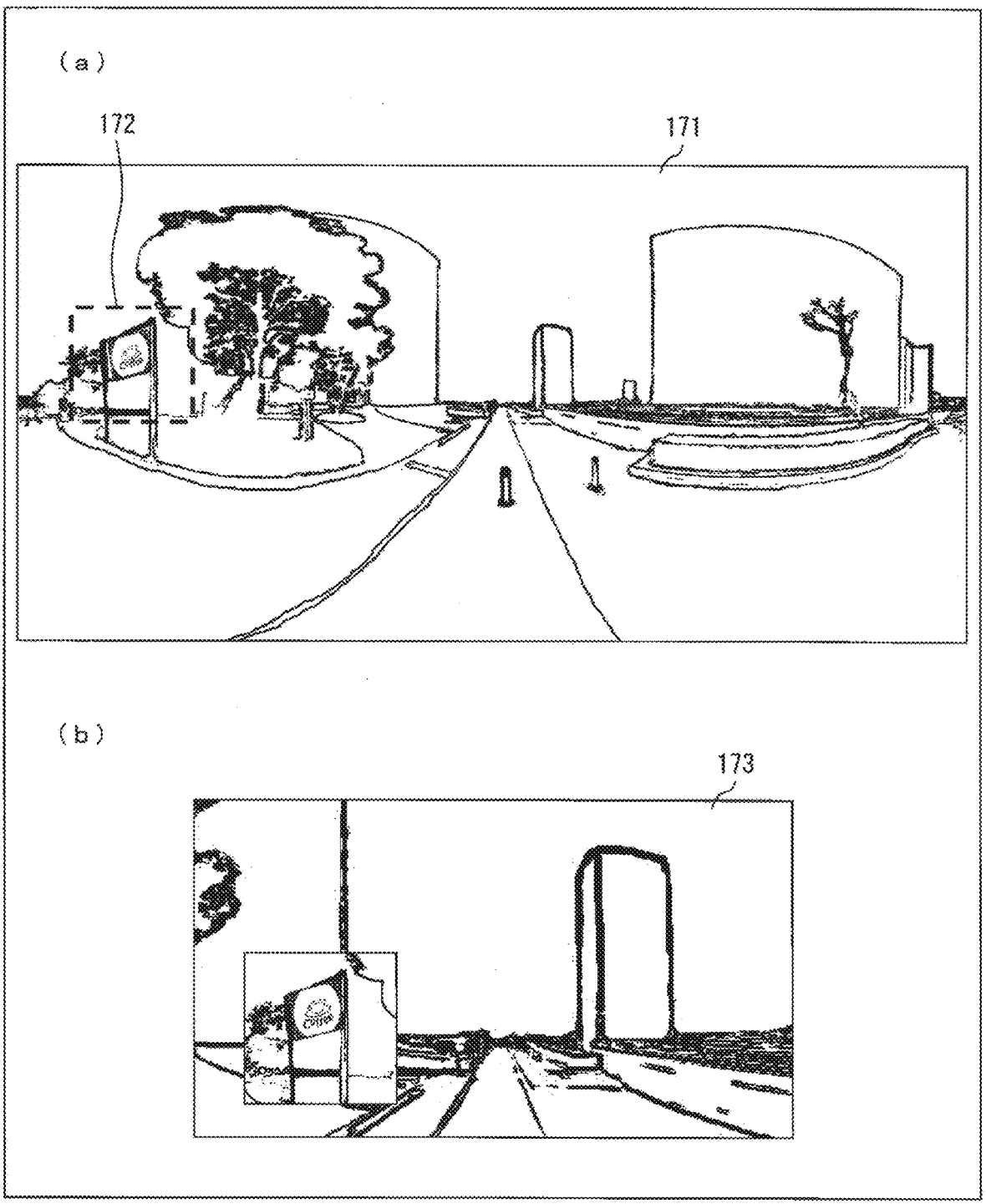
FIG. 7 is an example for describing image superimposition in Embodiment 2 of the present invention.

FIG. 6 is a functional block diagram illustrating the constitution of the image display device 1a including an image processing device 10a according to Embodiment 2 of the present invention. As illustrated in FIG. 6, the image display device 1a includes an imaging unit 20, a display unit 30, a storage control unit 40, and an image processing device 10a. Since the imaging unit 20, the display unit 30, and the storage control unit 40 are the same as those according to Embodiment 1, detailed description of those members will be omitted.

The image processing device 10a includes a feature portion extracting unit 11, a setting unit 12, an image generating unit 13, and a superimposition unit 14. Namely, the image processing device 10a includes the superimposition unit 14 further added to the image processing device 10 according to Embodiment 1.

The superimposition unit 14 superimposes an image obtained by cutting a region different from a region of a cut image from an input image on a cut image generated by the image generating unit 13. The image in the region outside an angle of view of the cut image is superimposed on the cut image and thus, important information such as a mark located outside the angle of view can be presented.

Details of Setting Unit 12

The setting unit 12 configures a line-of-sight direction, an angle of view, and a playback speed of the cut image to be generated, based on a feature portion to be extracted by the feature portion extracting unit 11. In this case, at least either the line-of-sight direction or the angle of view is changed to incorporate the feature portion in the angle of view of the cut image, although for example, the feature portion located opposite to a reference line-of-sight direction may be extracted. In this case, the amount of change in the line-of-sight direction or the angle of view or each of the line-of-sight direction and the angle of view increases. Thus, processing of the configuration of each value to reduce the amount of change in each of the line-of-sight direction and the angle of view, and outputting of the feature portion to the superimposition unit 14 is performed. This processing can suppress extrememovement of the line-of-sight direction and fluctuation in the angle of view. Therefore, such processing is suitable. Moreover, when the amount of change in each of the line-of-sight direction and the angle of view is configured to be zero, namely, to remain unchanged, the reference line-of-sight direction can continue to be confirmed. Therefore, such a configuration is suitable.

Details of Superimposition Unit 14

FIGS. 7A and 7B are views for describing details of the superimposition unit 14 in Embodiment 2 of the present invention. When the feature portion is input from the setting unit 12 to the superimposition unit 14, the superimposition unit 14 cuts a region 172 including the feature portion from an input image 171 and superimposes the region 172 on a cut image 173. The cut image 173 in FIG. 7B is an example in which the region 172 including the feature portion is superimposed. The region including the feature portion refers to a region having a predetermined size with the feature portion as the center. The region including the feature portion located outside the angle of view of the cut image is cut from the input image and the region is superimposed on the cut image and thus, while the cut image in the reference line-of-sight direction is confirmed, the feature portion located outside the angle of view of the cut image can be confirmed simultaneously. Therefore, such superimposition is suitable. The region including the feature portion cut from the input image is superimposed on a lower left portion of the cut image in FIG. 7B. However, when a position for the superimposition is changed according to a position of the feature portion, a user can easily grasp the position of the feature portion. Therefore, such a change of the position for superimposition is suitable. For example, in a case that the feature portion is located on an upper right portion of the input image, when a region including the feature portion is superimposed on the upper right portion of the cut image, a user can be notified of the feature portion not present in the angle of view of the cut image but located on the general upper right portion of the input image.

General Processing Flow

Figure 8:
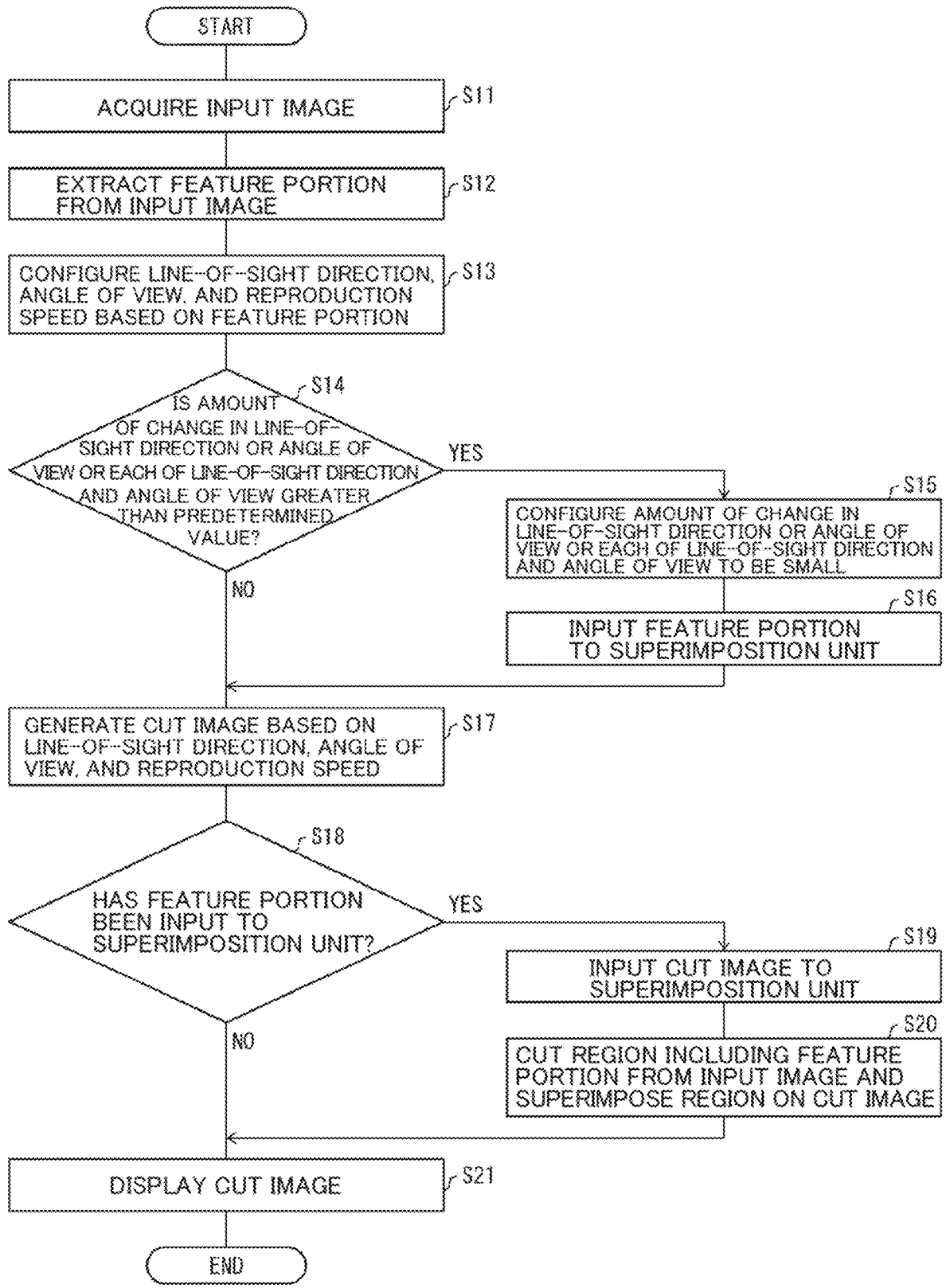
FIG. 8 is a flowchart illustrating a flow of an image processing method performed by the image display device according to Embodiment 2 of the present invention.

FIG. 8 is a flowchart illustrating a flow of an image processing method performed by the image display device 1a according to Embodiment 2 of the present invention. As illustrated in FIG. 8, when the processing starts, the image processing device 10a first acquires the input image to be subjected to image processing for display from the imaging unit 20 or the storage control unit 40 (S11). Next, the feature portion extracting unit 11 extracts the feature portion from the input image (S12). Next, the setting unit 12 configures the line-of-sight direction, the angle of view, and the playback speed of the cut image to be generated based on the feature portion (S13). Next, the setting unit 12 determines whether or not the amount of change in the line-of-sight direction or the angle of view or each of the line-of-sight direction and the angle of view is greater than a predetermined value (S14). When the amount of change is greater than the predetermined value, the setting unit 12 performs processing at S15 and S16. In a case that the setting unit 12 determines that the amount of change in the line-of-sight direction or the angle of view or each of the line-of-sight direction and the angle of view is greater than the predetermined value (Yes at S14), the setting unit 12 first configures each value to reduce the amount of change in each of the line-of-sight direction and the angle of view (S15). Next, the setting unit 12 inputs the feature portion to the superimposition unit 14 (S16).

Next, the image generating unit 13 generates an image based on the line-of-sight direction, the angle of view, and the playback speed configured by the setting unit 12 (S17).

Next, the superimposition unit 14 determines whether or not the feature portion has been input (S18). In a case that the superimposition unit 14 determines that the feature portion has been input, the superimposition unit 14 performs processing at S19 and S20. In the case that the superimposition unit 14 determines that the feature portion has been input (Yes at S18), the image generating unit 13 first outputs the cut image generated to the superimposition unit 14 (S19). Next, the superimposition unit 14 cuts a region including the feature portion from the input image, and superimposes the region on the cut image (S20).

Next, the display unit 30 displays the cut image subjected to the superimposition and input from the superimposition unit 14 (S21). In a case that the feature portion has been input to the superimposition unit 14, the display unit 30 displays the image obtained by superimposing the region including the feature portion cut from the input image on the cut image, namely, the image generated at S20. In a case that the feature portion has not been input to the superimposition unit 14, the display unit 30 displays the cut image generated at S17. Thus, the processing in FIG. 8 ends.

According to the image processing device 1a including the image processing device 10a according to Embodiment 2 of the present invention described above, the region located outside the angle of view of the cut image is superimposed on the cut image and thus, important information such as a mark located outside the angle of view can be presented.

Embodiment 3

In the present embodiment, a setting unit 12 configures a playback speed opposite to the playback speed in the embodiments described above. Namely, in a case that a feature portion is extracted by a feature portion extracting unit 11, the setting unit 12 configures the playback speed to be higher than a reference playback speed. Moreover, in a case that no feature portion is extracted by the feature portion extracting unit 11, the setting unit 12 configures the playback speed to be a stop or to be lower than the reference playback speed. Thus, a section of an input image including the feature portion can be distinguished from a section of the input image including the featureless portion. Similarly, in the present embodiment, a user easily recognizes the presence or absence of the feature portion.

Supplementary Note

In the present embodiment, a superimposition unit 14 superimposes an image cut from the input image, but the present invention is not limited to this embodiment. When an outer frame for clarifying a boundary between a cut image and a superimposed image, a character or symbol for describing the feature portion, and the like are superimposed in addition to the image cut, the feature portion can be clearly identified by the user. Therefore, such superimposition is suitable. Not only description of the feature portion but also information about a position and the direction of the feature portion may be superimposed as an example of a character or symbol for describing the feature portion. In this way, a direction of a superimposed image with respect to a current line-of-sight direction can be displayed more clearly.

Note that the present invention is not construed in a limited manner by the embodiments described above. Various modifications can be made within the scope of the matters described in the claims, and are within the technical scope of the present invention.

Note that each constituent element of the present invention can be selected arbitrarily.

A program operating on an image processing device according to an aspect of the present invention may be a program (a program causing a computer to function) controlling a CPU and the like to realize the functions of the above-described embodiments according to an aspect of the present invention. Then, information handled in these devices is temporarily stored in a Random Access Memory (RAM) in the case that information is processed. Thereafter, the information is stored in various types of Read Only Memory (ROM) such as a ROM and an HDD, and as necessary, read, modified or rewritten by the CPU.

Moreover, a program realizing each function of the constitution in FIG. 1 may be recorded on a computer-readable recording medium to cause a computer system to read the program recorded on the recording medium, and may be performed by the CPU and the like to perform the processing of each of the units. Note that the "computer system" here includes an Operating System (OS) and hardware such as a peripheral device. Moreover, the "computer-readable recording medium" refers to a portable medium such as a flexible disk, a magnetic optical disk, a ROM, and a CD-ROM, or a storage device such as a hard disk built in a computer system. Further, the "computer-readable recording medium" includes a medium configured to dynamically retain the program for a short period of time, such as a communication line used in a case where the program is transmitted via a network such as the Internet or via a communication circuit such as a telephone circuit, and a medium configured to retain the program for a certain period of time, such as a volatile memory inside a computer system serving as a server or a client in that case.

Moreover, the image processing device in each of the embodiments described above may partially or entirely be realized typically as an LSI being an integrated circuit.

Each of the functional blocks of the image processing device may be realized individually as a chip, or may partially or entirely integrated into a chip. Moreover, the circuit integration technique is not limited to an LSI, and may be realized with a dedicated circuit or a multi-purpose processor. Moreover, in a case where due to the advancement of semiconductor technology, a circuit integration technology alternative to an LSI appears, it would also be possible to use an integrated circuit according to such technology.

Moreover, in the embodiments described above, control lines and information lines considered to be necessary for the description are described, and all control lines and information lines of a product are not necessarily described. All the constitution may be connected mutually.
Supplement An image processing device (10) according to aspect 1 of the present invention is an image processing device (10) configured to edit and output a video that has been inputted. The image processing device (10) includes a feature portion detecting unit (11) configured to detect a feature portion from a frame incorporated in the video, and an output unit (a setting unit 12, an image generating unit 13) configured to cause the playback speed of a frame incorporated in the video as well as the feature portion detected to be different from a playback speed of a frame including no feature portion detected, and output the video.

According to the constitution described above, an image subjected to proper editing processing can be generated according to the feature portion detected from the input image.

According to aspect 2 of the present invention, in the image processing device (10) according to aspect 1 described above, the output unit (the setting unit 12, the image generating unit 13) may be configured to cut a portion of each frame of the video and output the portion of the frame, and configure a cut range of a frame including the feature portion detected to incorporate the feature portion in the cut range or to make the cut range closer to the feature portion than a frame previous to the frame.

According to the constitution described above, a user can easily recognize the presence or absence of the feature portion.

According to aspect 3 of the present invention, in the image processing device (10) according to aspect 2 described above, the output unit (the setting unit 12, the image generating unit 13) may be configured to configure a reference position in the frame serving as a reference when a portion of the frame is cut to be a position in the frame of a subject located ahead in a traveling direction of the position at which the video is captured.

According to the constitution described above, the cut image cut with the position in the traveling direction as the center can be generated.

According to aspect 4 of the present invention, in the image processing device (10) according to aspect 2 or 3 described above, the output unit (the setting unit 12, the image generating unit 13) may be configured to perform at least one of configuration including configuring the playback speed to be at a stop or lower than a reference playback speed serving as a reference in a case that a feature portion is present in the frame, configuration including configuring the playback speed to be higher than the reference playback speed in a case that no feature portion is present in the frame, and configuration including moving a position of the cut range in the frame upward in the frame in a case that the video is a video captured while an imaging device configured to capture the video is rotating in a horizontal direction.

According to the constitution described above, the feature portion is more easily confirmed.

According to aspect 5 of the present invention, in the image processing device (10) according to any one of aspects 2 to 4 described above, the video may be a video captured with movement of an imaging device configured to capture the video, the movement may include movement involving rotation of the imaging device, the feature portion detecting unit (11) may be configured to obtain a value indicating conspicuity for each pixel constituting the frame, and the feature portion detecting unit (11) may be configured to perform at least either the weighting of the value to make it easy to detect a feature portion close to a position in the frame of a subject located ahead in a traveling direction of the imaging device from the frame, and determining whether the video is a video captured during the movement involving the rotation, and weighting the value to make it easy to detect from the video a feature portion in the video captured during the movement involving the rotation.

According to the constitution described above, the range of detecting the feature portion can be adjusted, and the feature portion to be preferentially detected can be changed.

According to aspect 6 of the present invention, the image processing device (10) according to any one of aspects 2 to 5 described above further includes a superimposition unit (14) configured to cut a region including a feature portion from the frame and superimpose the region on an output image obtained by cutting a portion of the frame. In the image processing device (10), the output unit (the setting unit 12, the image generating unit 13) may be configured to configure, in a case that an amount of change in at least one of a position of the cut range in the frame to be changed to incorporate the feature portion in the cut range of the output image and the cut range is greater than a reference amount of change serving as a reference, each value to make the amount of change in at least one of the position of the cut range in the frame and the cut range smaller than the reference amount of change, and the superimposition unit (14) may be configured to superimpose a region including the feature portion on the output image.

According to the constitution described above, extreme movement of a position in the input image and fluctuation in the cut range can be suppressed. Moreover, important information such as a mark located outside an angle of view can be presented.

The image processing device according to each of the aspects of the present invention may be realized by a computer. In this case, an image processing program of the image processing device causing a computer to operate as each unit (software component) incorporated in the image processing device and thus causing the computer to realize the image processing device, and a computer-readable recording medium including the image processing program recorded are also within the scope of the present invention.

An aspect of the present invention is not limited to each of the above-described embodiments. It is possible to make various modifications within the scope of the claims. An embodiment obtained by appropriately combining technical elements each disclosed in different embodiments falls also within the technical scope of the present invention. Further, when technical elements disclosed in the respective embodiments are combined, it is possible to form a new technical feature.

CROSS-REFERENCE OF RELATED APPLICATION

This application claims the benefit of priority to JP 2016-114835 filed on Jun. 8, 2016, which is incorporated herein by reference in its entirety.

INDUSTRIAL APPLICABILITY

An aspect of the present invention is applicable to an image processing device.

REFERENCE SIGNS LIST 1, 1a Image display device
10, 10a Image processing device
11 Feature portion extracting unit (Feature portion detecting unit)
12 Setting unit (Output unit)
13 Image generating unit (Output unit)
14 Superimposition unit
20 Imaging unit
30 Display unit
40 Storage control unit

The invention claimed is:

1. An image processing device configured to edit and output a video having been input, the image processing device comprising:
 a feature portion detecting circuitry configured to detect a feature portion from multiple frames incorporated in the video; and
 an output circuitry configured to cause a playback speed of a frame incorporated in the video and including the feature portion detected to be different from a playback speed of a frame including no feature portion detected, and output the video, wherein
 the output circuitry is configured to:
 cut a portion of each one of the multiple frames as a cut range and output the portion each one of the multiple frames, and
 make such settings as to cause the cut range to be closer to the feature portion in that one of the frames than in a preceding one of the frames,
 the output circuitry is configured to perform at least one of
 configuration including configuring the playback speed to be a stop or to be lower than a reference playback speed serving as a reference in a case that a feature portion is present in the frame,
 configuration including configuring the playback speed to be higher than the reference playback speed in a case that no feature portion is present in the frame, and
 configuration including moving a position of the cut range in the frame upward in the frame in a case that the video is a video captured while an imaging device configured to capture the video is rotating in a horizontal direction.

2. The image processing device according to claim 1, wherein
 the output circuitry is configured to
 configure the cut range of the frame including the feature portion detected to incorporate the feature portion in the cut range.

3. The image processing device according to claim 1, wherein
 the output circuitry is configured to configure a reference position in the frame serving as a reference when a portion of the frame is cut to be a position in the frame of a subject located ahead in a traveling direction of a position at which the video is captured.

4. An image processing device configured to edit and output a video having been input, the image processing device comprising,
 a feature portion detecting circuitry configured to detect a feature portion from multiple frames incorporated in the video, and
 an output circuitry configured to cause a playback speed of a frame incorporated in the video and including the feature portion detected to be different from a playback speed of a frame including no feature portion detected, and output the video, wherein
 the video is a video captured with movement of an imaging device configured to capture the video, the movement includes movement involving rotation of the imaging device,
 the feature portion detecting circuitry is configured to obtain a value indicating conspicuity for each of pixels constituting the frame, and
 the feature portion detecting circuitry is configured to perform at least any one of
 weighting the value to make it easy to detect from the frame a feature portion close to a position in the frame of a subject located ahead in a traveling direction of the imaging device, and
 determining whether the video is a video captured during the movement involving the rotation, and weighting the value to make it easy to detect from the video a feature portion in the video captured during the movement involving the rotation.

5. A non-transitory computer readable recording medium comprising an image processing program causing a computer to function as the image processing device according to claim 1, wherein
the image processing program causes the computer to function as the feature portion detecting circuitry and the output circuitry.

\* \* \* \* \*